April 7, 1970            K. D. DOYLE            3,504,805
TELESCOPING SUPPORT ROD AND UNIVERSAL END CAP THEEFOR
Filed April 13, 1967
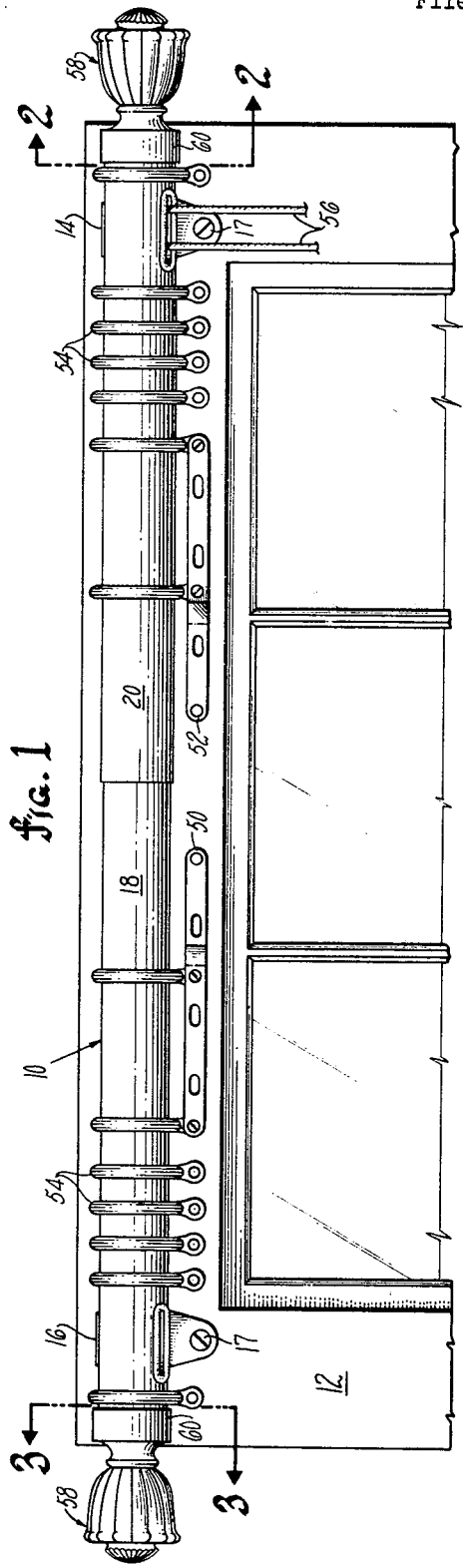
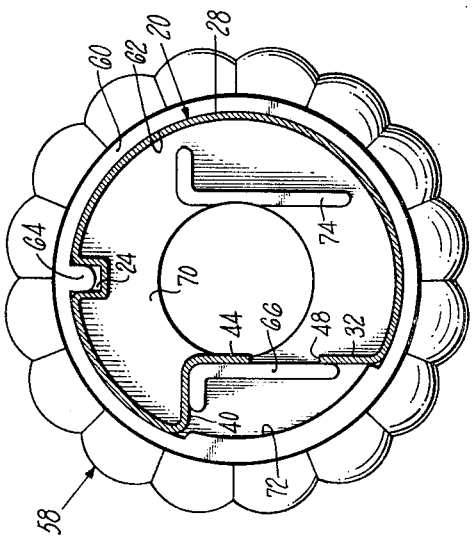
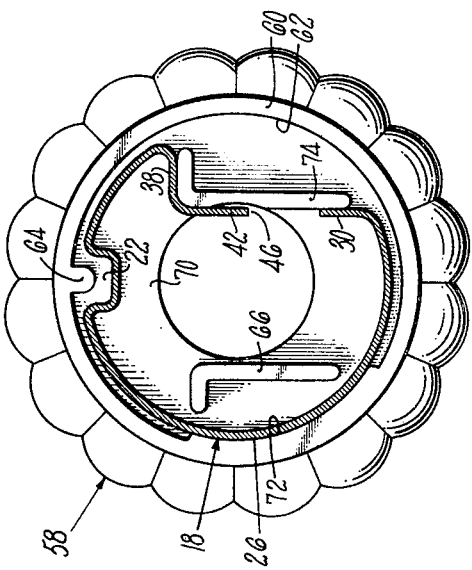
INVENTOR.
KIERAN D. DOYLE
BY Lindsey, Pritzman and Hayes
ATTORNEY

United States Patent Office 3,504,805
Patented Apr. 7, 1970

3,504,805
TELESCOPING SUPPORT ROD AND UNIVERSAL END CAP THEREFOR
Kieran D. Doyle, Wallingford, Conn., assignor to The Stanley Works, New Britain, Conn., a corporation of Connecticut
Filed Apr. 13, 1967, Ser. No. 630,323
Int. Cl. A47h 1/022, 1/02
U.S. Cl. 211—105.3            7 Claims

ABSTRACT OF THE DISCLOSURE

A telescoping support rod having a universal end cap or finial with an annular recess in the end thereof and provided with peripheral walls and a pair of axially extending tangs spaced from the walls for selectively and compressively engaging the ends of the telescoping rod members so as to frictionally secure the universal end cap on either of the rod members.

---

This invention relates to telescoping support rods and the like and has particular significance to end caps or finials for a telescoping drapery support rod wherein a single end cap or finial compressively surrounds and is frictionally secured to the end of either the larger or smaller of the telescoping members forming the rod.

One of the objects of the invention is to provide a unique universal end cap for engaging either end of the assembled members forming a telescoping support rod. Included in this object is the provision of such an end cap which compressively and frictionally engages the outer surface of either end of a telescoping support rod to secure the cap thereto.

A further object of this invention is to provide a single end cap mountable on the ends of a roll formed telescoping support rod by frictional engagement with either end thereof to support and retain the ends to the desired dimensions and configuration.

Still another object of this invention is to provide a single end cap or finial for a telescoping rod which frictionally engages the end of either the inner or outer telescoping member despite variations in the gauge of the material forming the members.

Other objects will be in part obvious and in part pointed out more in detail hereinafter.

The invention accordingly consists in the features of construction, combination of elements and arrangement of parts which is exemplified in the construction hereafter set forth, and the scope of the invention is indicated in the appended claims.

In the drawing:

FIG. 1 is a front view of a telescoping cafe traverse rod incorporating the end caps of the present invention;

FIG. 2 is an enlarged cross-sectional view taken along the lines 2—2 of FIG. 1; and FIG. 3 is an enlarged cross-sectional view taken along the lines 3—3 of FIG. 1.

Referring now to the drawing, in which like numerals refer to like parts throughout the several views, there is shown in FIG. 1 a telescoping drapery support rod 10 mounted on a window frame 12 by a pair of brackets 14, 16 by suitable fasteners 17. The support rod 10 comprises an inner telescoping member 18 and an outer telescoping member 20 of similar cross-sectional configuration assembled in close fitting telescoping relationship so that the length of rod 10 may be adjusted.

The inner and outer telescoping rod members 18, 20 of the illustrative embodiment are roll formed to provide curved walls 26, 28 to produce a generally three-quarter round cross section and are shown as having nested mating ribs or grooves 22, 24 at the tops thereof. Flat horizontal walls 38, 40 of the respective rods join flat vertical wall sections 42, 44 which in turn are spaced apart and coplanar with respect to the lower wall sections 30, 32 respectively of the rod members 18, 20 to provide an angular recess to complete the cross-sectional configuration of the rod members and form aligned longitudinal slots 46, 48 on the back wall thereof. The rod members 18, 20 may be beaded, fluted or smooth as desired.

The usual master carriers 50, 52 and a suitable number of curved ring glides 54 are shown as being mounted for longitudinal movement along slots 46, 48, and a pull cord 56 is shown as being provided for shifting the master carriers 50, 52 to open and close the draperies supported by the carriers and glides.

In accordance with this invention, a single end cap or finial 58 formed of any suitable material, such as a molded polystyrene, is constructed and arranged so as to compressively engage either end of the telescoping rod 10.

Referring particularly to FIG. 2, the end of the end cap 58 comprises a cylindrical peripheral wall 60 having an inner surface 62 which closely conforms to the outer generally cylindrical wall 28 of the outer telescoping member 20. An axially extending rib 64 may be provided for visually aligning the end cap with the groove 24 during assembly. A generally L-shaped axially extending tang 66 projects from a recessed wall 70 of the end cap 58. L-shaped tang 66 is spaced from the peripheral wall 72 for purposes hereinafter more fully described.

As end cap 58 is assembled axially over the end of outer telescoping member 20, the inner surface 62 of cylindrical end wall engages the outer cylindrical wall 28 of outer telescoping member 20, and the L-shaped tang 66 engages the vertical walls 32, 44 and horizontal wall 40 thereof. The end of the roll formed rod member 20 has a slight enlargement, or flare, relative to the intermediate portions thereof due to the manufacture thereof. With the dimensioning of the outer cylindrical wall 60 of the end cap and the L-shaped projection 66 to substantially the same dimensions as the intermediate portion of the rod, the end cap will resiliently engage the rod member 20 to frictionally secure the end cap thereto. Moreover, with this construction, the end cap will shape and support the end of the rod member 20 to configuration which is uniform with the intermediate portion thereof thereby to prevent the divergence of the slot 48 toward the end thereof.

FIG. 3 illustrates the assembly of the end cap 58 on the end of the inner telescoping rod member 18. The inner rod 18 has smaller external dimensions in order for it to enter the end of outer telescoping rod 20 and thus will not frictionally engage the same cylindrical wall of the end cap 58 as did outer rod 20. As shown in FIG. 3, the inner periphery of wall 60 is provided with an arcuate abutment 72 having a smaller radius than the remaining portion of the peripheral wall so as to engage the curved wall 26 of the inner rod member 18.

As shown in FIG. 2, the arcuate abutment 72 is of limited angular length so as to fit between the horizontal flat wall 40 and the vertical wall 32 of the outer rod member 20 when applied thereto. Moreover, the height of arcuate abutment 72 is substantially equal to the thickness of outer rod member 20 to position the end cap substantially concentric with inner rod 18 when applied thereto.

The end cap 58 further provides a second L-shaped tang or stud 74 extending from the base wall 70 thereof. When the end cap 58 is applied to the inner rod member 18, tang 74 engages the horizontal wall 38 and the coplanar vertical walls 42 and 30 of rod member 18 to compressively clamp the end of the rod and to locate and frictionaly secure the end cap 58 thereon in a manner similar to that described above in connection with FIG. 2.

It will be observed in FIG. 2 that L-shaped tang 74 is spaced from the peripheral wall 62 to accommodate the cylindrical wall 28 of the outer rod member 20 when the cap is applied to the end thereof.

As viewed in FIGS. 2 and 3, L-shaped tang 74 extends higher and is disposed closer to a vertical plane through the end cap 58 than the L-shaped tang 66. This construction enables the abutments to respectively engage the horizontal walls 38, 40 respectively and to snugly fit into the corners defined by these horizontal walls and vertical walls 42, 44 of the inner and outer rods 18, 20 respectively even though inner rod member 18 is positioned within outer rod member 20 when the rods 18, 20 are assembled in telescoping relationship.

From the foregoing, it will be readily apparent that with the use of this invention a single end cap is provided for compressively engaging and supporting the different sized ends of a pair of telescoping support rods with the end cap being frictionally retained in concentric relationship on either of them to which it is applied. Moreover, it will be apparent that this design is one which will be adapted for use on telescoping closet bars made of different gauge materials in which the external dimensions of the inner rod member would differ in order to telescope within the outer rod member.

The embodiments of the invention in which an exclusive property or privilege is claimed are defined as follows:

1. In combination, a telescoping support rod comprising a pair of closely interfitting telescoping rod members of similar configuration and an end cap mounted on each end thereof, the improvement wherein the end caps are identical and comprise a continuous peripheral wall adapted to be positioned around the associated end of said telescoping support rod and a pair of tangs projecting axially within said peripheral wall and space therefrom so as to receive either end of the telescoping support rod with said peripheral wall and one of said tangs in engagement with the end of said rod to frictionally engage the same.

2. A device as recited in claim 1 wherein said support rod has a generally three-quarter round cross section and a longitudinally extending angular recess to receive said one of said tangs.

3. A device as recited in claim 2 wherein one of the tangs is offset vertically and horizontally relative to the other to accommodate the dimensional variations of said telescoping rod members.

4. A device as recited in claim 1 wherein said peripheral wall is provided with an inwardly directed arcuate abutment of limited angular length, said abutment being engageable with the inner of said pair of telescoping rod members when applied thereto.

5. A device as recited in claim 4 wherein the height of said abutment is substantially equal to the thickness of the outer rod member to concentrically position the end cap with respect to the inner rod member.

6. A device as recited in claim 2 wherein the rod is further provided with a longitudinally extending groove and the peripheral wall of the end cap has an inwardly extending rib for visually aligning the end cap with the rod for assembly.

7. A device as recited in claim 1 wherein said end cap is provided with a recessed bottom wall and said pair of tangs project therefrom.

References Cited
UNITED STATES PATENTS

| | | | |
|---|---|---|---|
| 684,674 | 10/1901 | Clark | 160—393 XR |
| 1,456,214 | 5/1923 | Boye | 211—105.3 XR |

BOBBY R. GAY, Primary Examiner

A. M. CALVERT, Assistant Examiner

U.S. Cl. X.R.

16—87; 138—109